US012122395B2

(12) United States Patent
Oh et al.

(10) Patent No.: US 12,122,395 B2
(45) Date of Patent: Oct. 22, 2024

(54) METHOD OF ESTIMATING WEIGHT OF VEHICLE

(71) Applicants: HYUNDAI MOTOR COMPANY, Seoul (KR); KIA MOTORS CORPORATION, Seoul (KR)

(72) Inventors: Ji Won Oh, Hwaseong-si (KR); Jeong Soo Eo, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 1021 days.

(21) Appl. No.: 16/856,365

(22) Filed: Apr. 23, 2020

(65) Prior Publication Data

US 2021/0163018 A1    Jun. 3, 2021

(30) Foreign Application Priority Data

Dec. 2, 2019    (KR) .................... 10-2019-0158424

(51) Int. Cl.
*B60W 40/13*    (2012.01)
*B60W 30/18*    (2012.01)
*B60W 50/00*    (2006.01)

(52) U.S. Cl.
CPC ...... *B60W 40/13* (2013.01); *B60W 30/18109* (2013.01); *B60W 2050/0056* (2013.01); *B60W 2050/0059* (2013.01); *B60W 2510/081* (2013.01); *B60W 2510/1005* (2013.01); *B60W 2520/28* (2013.01); *B60W 2540/12* (2013.01)

(58) Field of Classification Search
CPC ............................................. B60W 2040/1392
See application file for complete search history.

(56) References Cited

U.S. PATENT DOCUMENTS

2005/0010356 A1 *    1/2005  Ishiguro ............... G01G 19/086
701/124

FOREIGN PATENT DOCUMENTS

DE    102013211243 A1 *  12/2014  ............ B60W 40/13

* cited by examiner

*Primary Examiner* — Christian Chace
*Assistant Examiner* — Katherine Marie Fitzharris
(74) *Attorney, Agent, or Firm* — MCDONNELL BOEHNEN HULBERT & BERGHOFF LLP

(57) ABSTRACT

The present disclosure provides a method of estimating a weight of a vehicle, including determining whether a current state is an enable state in which a vehicle stoppage event due to brake occurs from vehicle driving information, by a weight estimating system, when the current state is the enable state, removing noise by filtering an acceleration signal input from an acceleration sensor at a moment when the vehicle is stopped, by the weight estimating system, determining a period value of an acceleration signal from the acceleration signal from which noise is removed, by the weight estimating system, and estimating the weight of the vehicle using information on the determined period value, by the weight estimating system.

12 Claims, 6 Drawing Sheets

METHOD OF ESTIMATING WEIGHT OF VEHICLE

CROSS-REFERENCE TO RELATED APPLICATION

This application claims under 35 U.S.C. § 119(a) the benefit of priority to Korean Patent Application No. 10-2019-0158424 filed on Dec. 2, 2019, the entire contents of which are incorporated herein by reference.

BACKGROUND

(a) Technical Field

The present disclosure relates to a method of estimating a weight of a vehicle, and more particularly, to a method of estimating a current weight of a vehicle simply using existing hardware without use of an additional sensor in a vehicle.

(b) Background Art

Weight information of a vehicle is used in various ways in vehicle control, and in particular, when weight information of a vehicle is used in vehicle, it is possible to largely enhance control performance.

For example, with regard to a freight car, when weight information of the freight car is applied to control torque of a driving wheel, unnecessary wheel slip may be prevented from occurring.

When weight information of a vehicle is applied to perform electronic stability control (ESC), stability control performance of the vehicle may be optimized, and when the weight information of the vehicle is applied, it is possible to predict and display an accurate available driving distance.

In addition, when sprung weight information is applied to control variable damper suspension, it is possible to control optimum damping force in real time.

However, a fine sensor also needs to be installed in a vehicle in order to measure the weight of the vehicle, which is the main cause of increasing manufacturing costs.

SUMMARY OF THE DISCLOSURE

The present disclosure has been made in an effort to solve the above-described problems associated with prior art.

In one aspect, the present disclosure provides a method of estimating a current weight of a vehicle simply using existing hardware without use of an additional sensor in a vehicle.

In a preferred embodiment, a method of estimating a weight of a vehicle includes determining whether a current state is an enable state in which a vehicle stoppage event due to brake occurs from vehicle driving information, by a weight estimating system, when the current state is the enable state, removing noise by filtering an acceleration signal input from an acceleration sensor at a moment when the vehicle is stopped, by the weight estimating system, determining a period value of an acceleration signal from the acceleration signal from which noise is removed, by the weight estimating system, and estimating the weight of the vehicle using information on the determined period value, by the weight estimating system.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

Figure 1:
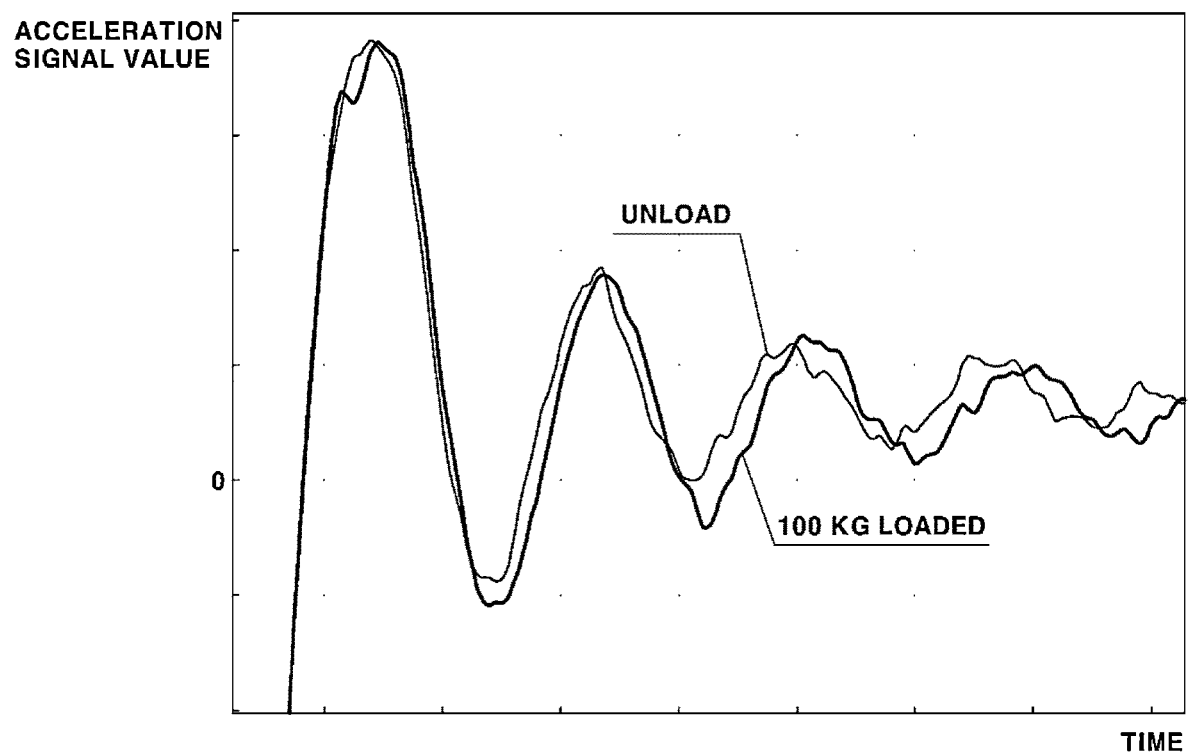
FIG. 1 is a diagram illustrating a result of measurement of an acceleration sensor in an actual vehicle.

Exemplary embodiments of the present disclosure are described in detail so as for those of ordinary skill in the art to easily implement the present disclosure with reference to the accompanying drawings. However, the present disclosure may be implemented in various different forms and is not limited to these embodiments.

In the specification, when a certain part "includes" a certain component, this indicates that the part may further include another component instead of excluding another component unless there is no different disclosure.

The present disclosure provides a method of estimating a current weight of a vehicle simply using existing hardware without use of an additional sensor in a vehicle.

Thus far, research has been conducted to estimate a weight of a vehicle without additional costs using driving torque of the vehicle, an existing sensor in a vehicle, or the like, but there are many limitations in actual application due to inaccuracy of torque information, a driving resistance model, a driving system model, or the like, which is a required input parameter.

In particular, when a vehicle travels on a slope with a gradient or a pitch behavior of the vehicle occurs because the vehicle travels on an irregular road surface, it is not possible to apply the conventional technology of estimating a weight.

Accordingly, the present disclosure proposes a method of determining a weight of a vehicle using a signal of an acceleration sensor that is pre-installed in the vehicle without installation or use of an additional sensor and use of torque information, a model, or the like.

Most weight changes except for fuel consumption are caused by man riding or carrying freight, which is an event that occurs when a vehicle is stopped.

Accordingly, according to the present disclosure, weight measurement may not be performed when a vehicle travels, and may be performed only when the vehicle is stopped.

According to the present disclosure, a basic principle of weight measurement is based on a measurement value of an acceleration sensor, that is, a vibration pattern in a signal of the acceleration sensor when a vehicle is stopped.

The acceleration sensor installed in the vehicle detects a vehicle acceleration and is configured to output an electrical signal depending on an acceleration detection value. In this case, a general acceleration sensor in a vehicle refers to a longitudinal acceleration sensor, and a signal output from the acceleration sensor refers to a signal (a longitudinal acceleration signal) indicating a longitudinal acceleration of the vehicle.

Hereinafter, unless differently defined in the present disclosure, acceleration refers to a longitudinal acceleration of a vehicle, and an acceleration sensor refers to a longitudinal acceleration sensor pre-installed in a vehicle.

A signal and acceleration signal of the acceleration sensor may refer to a signal output from the acceleration sensor.

According to the present disclosure, a weight of a vehicle may be estimated from vehicle acceleration information related to a vehicle behavior phenomenon that occurs when the vehicle is stopped, and in detail, the weight of the vehicle may be estimated using a signal output from the acceleration sensor when the vehicle is stopped, that is, an acceleration signal indicating vehicle acceleration at a moment when the vehicle is stopped.

In more detail, the weight of the vehicle may be estimated by measuring and analyzing a period of vibration of a signal in the acceleration signal indicating the vehicle acceleration.

Vibration of the acceleration signal is a function of a weight of a vehicle and a period of the vibration is changed. As seen from this principle, as a period of vibration of an acceleration signal output from the acceleration sensor increases, the weight of the vehicle increases, and as the period of vibration of the acceleration signal output from the acceleration sensor decreases, the weight of the vehicle decreases.

Thus, according to the present disclosure, the weight may be measured using a function of the period of vibration of the acceleration signal generated at a moment when a vehicle is stopped.

FIG. 1 is a diagram illustrating a result of measurement of an acceleration sensor in an actual vehicle and illustrates an example of an acceleration signal output from an acceleration sensor at a moment when a vehicle is stopped.

The present disclosure may use a signal output from the acceleration sensor at a moment when a vehicle is stopped after being decelerated by depressing a brake pedal by a driver. In this regard, FIG. 1 shows an example of the signal.

In particular, FIG. 1 illustrates comparison of an example of an acceleration signal output by an acceleration sensor between a load state in which a freight is loaded in a vehicle and an unload state (empty state) in which a freight is not loaded in the same vehicle.

As seen from FIG. 1, a period of vibration of the acceleration signal output by the acceleration sensor when a vehicle is stopped in the state in which a freight having 100 kg is loaded may be increased compared with the case in which the vehicle is stopped in an unload state.

Figure 2:
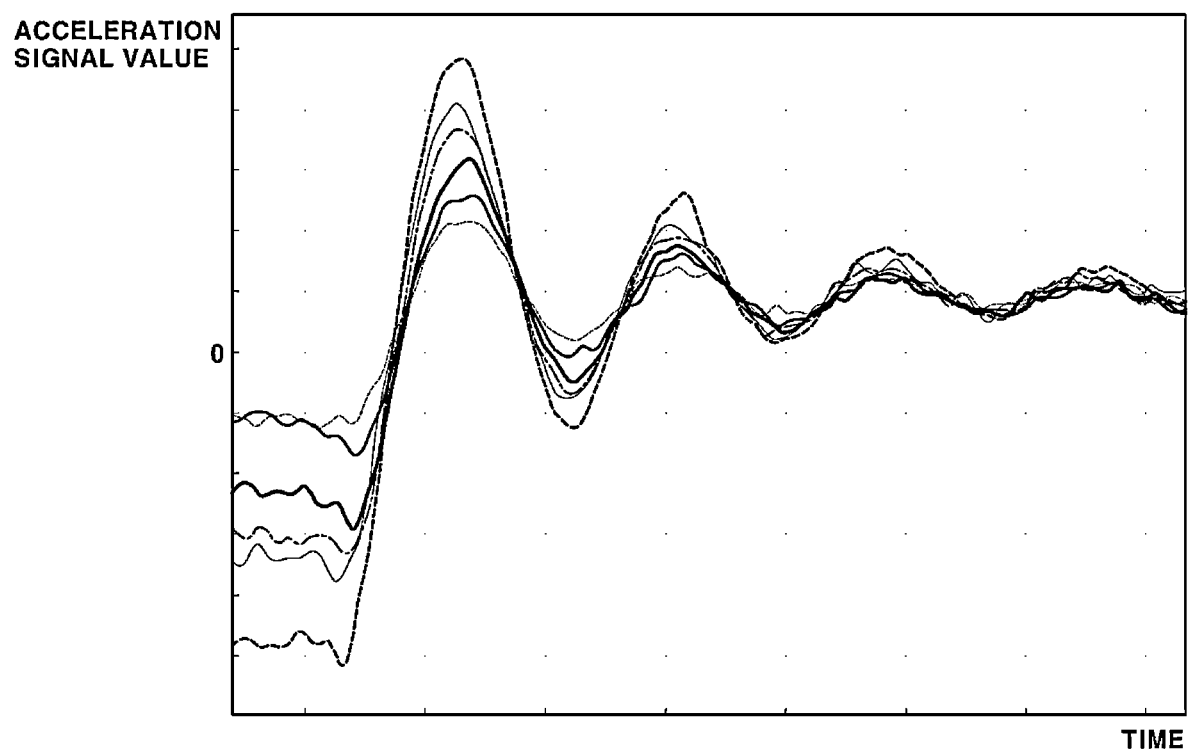
FIG. 2 is a diagram illustrating comparison between acceleration signals which are measured by changing driver brake strength when a vehicle is stopped.

FIG. 2 is a diagram illustrating comparison between acceleration signals (i.e., output signals of an acceleration sensor) which are measured by changing driver brake strength when a vehicle is stopped.

Here, the brake strength refers to a driver pedal manipulation state such as a brake pedal manipulated variable or manipulated intensity (a degree of strongly or weakly depressing the pedal). In this regard, FIG. 2 shows acceleration signals measured at a moment when a vehicle is stopped in respective brake situations in which a driver changes a manipulation state of a brake pedal.

All of the brake situations of FIG. 2 are tested under the same vehicle conditions as FIG. 1 except for the brake strength, and in particular, the same vehicle load is applied to the brake situation of FIG. 2 as for FIG. 1.

That is, the diagram shows the acceleration signals measured by changing only the brake strength for each brake situation under the same condition of a weight of a vehicle.

As seen from FIG. 2, even if the driver brake strength is changed, when the weight of the vehicle is not changed, periods of vibration of the acceleration signals generated at a moment when the vehicle is stopped are the same, but amplitudes of the acceleration signals are different as the driver brake strengths are different, as shown in FIG. 2.

Like in the test result, although the brake strengths are different by above five times when the weight of the vehicle is not changed, all periods of vibration of the acceleration signals at a moment when the vehicle is stopped are the same, which means that it is possible to estimate the weight of the vehicle using a period of vibration of the acceleration signal at a moment when the vehicle is stopped, irrespective of the driver brake strength or the brake manipulation state.

The present inventor has performed repetitive experimentation and found that, when the weight of a vehicle is not changed, vibration patterns of acceleration signals acquired through an acceleration sensor at a moment when the vehicle is stopped are the same irrespective of a driver brake pedal manipulated variable, manipulated intensity, or the like immediately before the vehicle is stopped.

Accordingly, according to the present disclosure, a fine vehicle behavior at a moment when a driver manipulates a brake pedal to make the vehicle be stopped may be measured through an acceleration sensor, and the weight of the vehicle may be estimated from an acceleration signal acquired through the acceleration sensor.

In addition, according to the present disclosure, the weight of the vehicle may be estimated and the estimated weight of the vehicle may be updated whenever the vehicle is stopped (i.e., whenever a stoppage event occurs) while traveling.

For example, the weight of the vehicle may be estimated when the vehicle is stopped at a traffic light, and may be estimated and updated whenever the vehicle is stopped at the traffic light.

Figure 3:
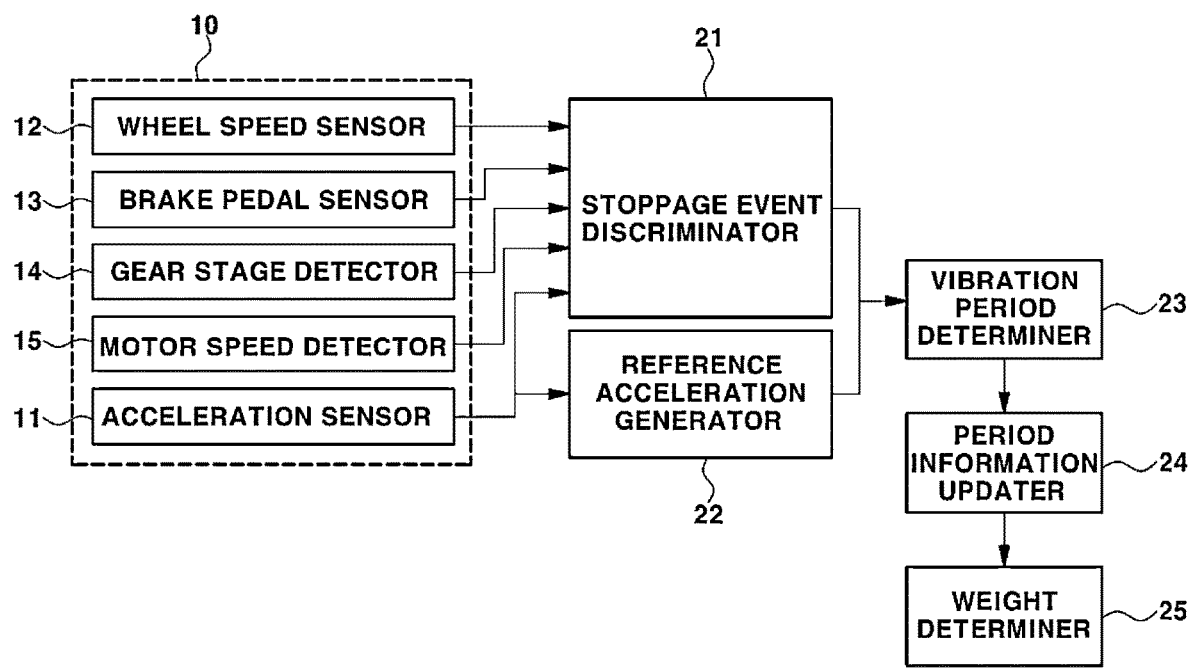
FIG. 3 is a block diagram illustrating the configuration of a system for estimating a weight of a vehicle according to the present disclosure.

FIG. 3 is a block diagram illustrating the configuration of a system for estimating a weight of a vehicle according to the present disclosure. As shown in the drawing, the system for estimating the weight of the vehicle may include a driving information detector 10, an acceleration sensor 11, a stoppage event discriminator 21, a reference acceleration generator 22, a vibration period determiner 23, a period information updater 24, and a weight determiner 25.

The driving information detector 10 may be a component for detecting current vehicle driving information for determining whether a stoppage event of the vehicle occurs, and the driving information may be vehicle wheel speed and a brake pedal input value.

In this case, the driving information detector 10 may include a wheel speed sensor 12 for detecting a vehicle wheel speed and a brake pedal sensor (BPS) 13 for detecting a brake pedal input value.

The wheel speed sensor 12 and the BPS 13 may also be a sensor that is pre-installed and used in the vehicle.

The driving information may further include a vehicle acceleration, a gear stage, and a motor speed, and in this case, the driving information detector 10 may include the acceleration sensor 11 for detecting a vehicle acceleration, a gear stage detector 14 for detecting a current gear stage, and a motor speed detector 15 for detecting a motor speed.

According to the present disclosure, acceleration information (vehicle longitudinal acceleration information) detected by the acceleration sensor 11 may be used as one of piece of information for determining whether a stoppage event of the vehicle occurs, and in this case, the acceleration sensor 11 may be a sensor in the driving information detector for determining whether the stoppage event of the vehicle occurs.

However, according to the present disclosure, a signal of the acceleration sensor 11 may be substantially used as a main signal for detecting the weight of the vehicle as described below as well as may be used to determine whether a stoppage event of the vehicle occurs as described above.

The stoppage event discriminator 21 may determine whether the stoppage event of the vehicle occurs from the driving information detected by the driving information detector 10. According to the present disclosure, the stoppage event discriminator 21 may determine whether to satisfy an enable condition to then determine weight estimation.

More specifically, whether to satisfy an enable condition for weight estimation may be determined based upon driving information, such as a wheel speed detected by the wheel speed sensor 12, or the brake pedal input value detected by the BPS 13.

According to the present disclosure, when the stoppage event discriminator 21 determines that the enable condition determined based on the current vehicle driving information is satisfied, the vehicle may become in the enable state and the weight of the vehicle may be estimated.

Procedures of determining whether the stoppage event occurs and the enable condition based on the driving information of the vehicle will be described below in more detail.

In FIG. 3, as described above, the acceleration sensor 11 may be a sensor for outputting an acceleration signal, and the acceleration signal indicating a fine behavior of the vehicle as the vehicle is stopped may be used as one of pieces of vehicle driving information for determining whether to satisfy the enable condition as well as may be used as a main signal for estimating a weight.

Then, the reference acceleration generator 22 may be a component for generating a reference acceleration signal from the acceleration signal output from the acceleration sensor 11, and may be configured to filter the acceleration signal to generate a reference acceleration signal.

To this end, the reference acceleration generator 22 may include a filter for filtering the acceleration signal to generate a reference acceleration which is an acceleration reference value, and a filter for generating the reference acceleration which is the acceleration reference value in the reference acceleration generator 22 may be a low pass filter.

The low pass filter of the reference acceleration generator 22 may use, as an input, the acceleration signal output from the acceleration sensor 11, and according to the present disclosure, a signal filtered and output by the low pass filter may be used as the reference acceleration signal.

The low pass filter of the reference acceleration generator 22 may be a filter having a predetermined cutoff frequency to generate a desired reference acceleration signal from the acceleration signal, and needs to be a filter having a lower cutoff frequency than a low pass filter for noise removal of the vibration period determiner 23, which will be described below.

The vibration period determiner 23 of the weight estimating system may be a component for receiving the acceleration signal output from the acceleration sensor 11 and measuring a period of vibration of the acceleration signal, and may be configured to first remove noise form the acceleration signal through filtering and then to measure the period of vibration from the acceleration signal from which noise is removed.

That is, the vibration period determiner 23 may include a filter for noise removal, and here, the filter for noise removal may be a low pass filter, and accordingly, the vibration period determiner 23 may determine the period of vibration from the acceleration signal from which noise is removed using the low pass filter.

The period information updater 24 of the weight estimating system may update and store the period determined by the vibration period determiner 23, and as described below, period information updater 24 may update the period of vibration determined from the acceleration signal in order and may store the updated period, and may sum information on the period updated in turn using a predetermined method to derive final period information.

Although FIG. 3 illustrates an example in which the vibration period determiner 23 receives the acceleration signal output from the acceleration sensor 11 through the reference acceleration generator 22, this is merely exemplary, or alternatively, the vibration period determiner 23 may directly receive and use the signal of the acceleration sensor 11.

The weight determiner 25 may estimate the weight of the vehicle using the determined final period information.

Figure 4:
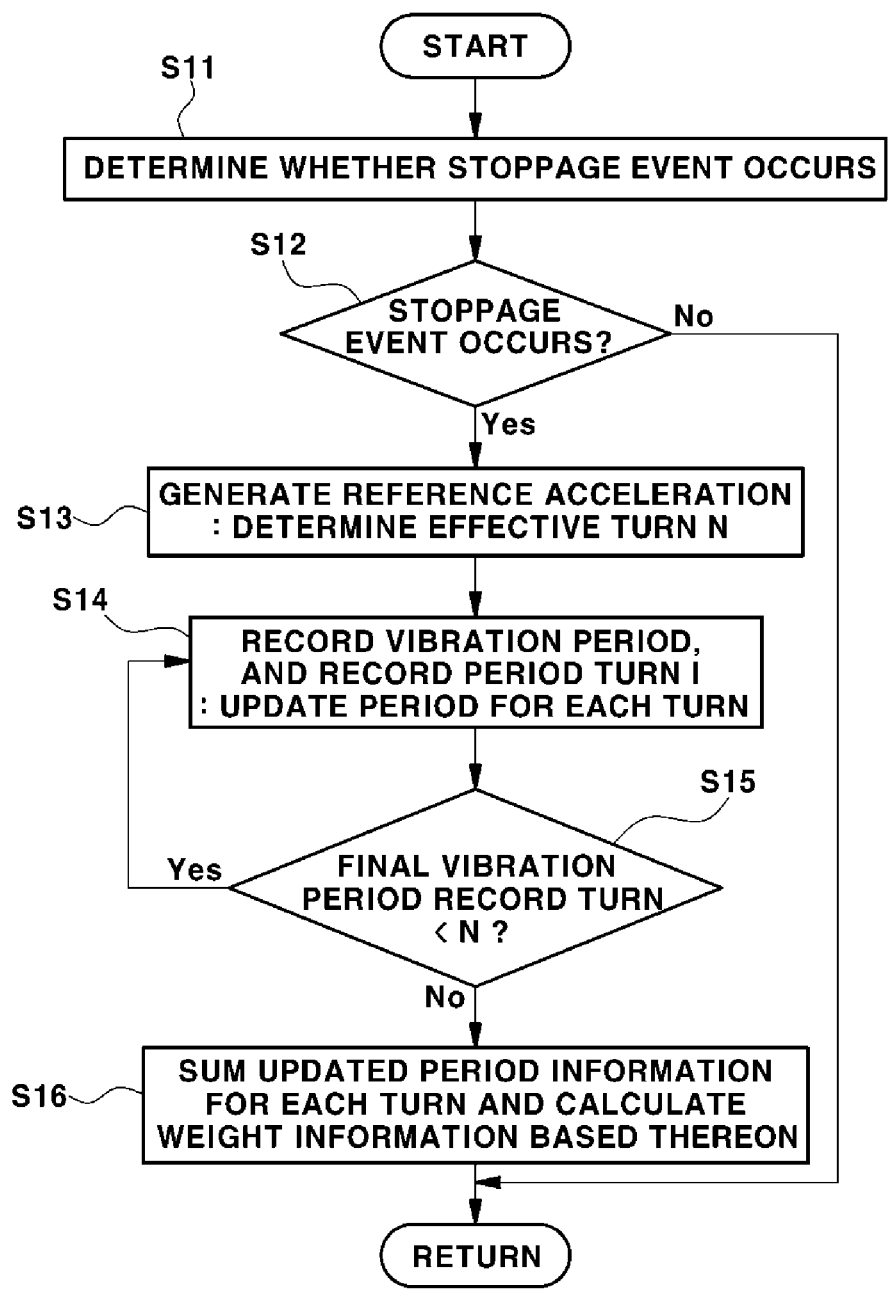
FIG. 4 is a flowchart illustrating procedures of estimating a weight according to an embodiment of the present disclosure.
Figure 5:
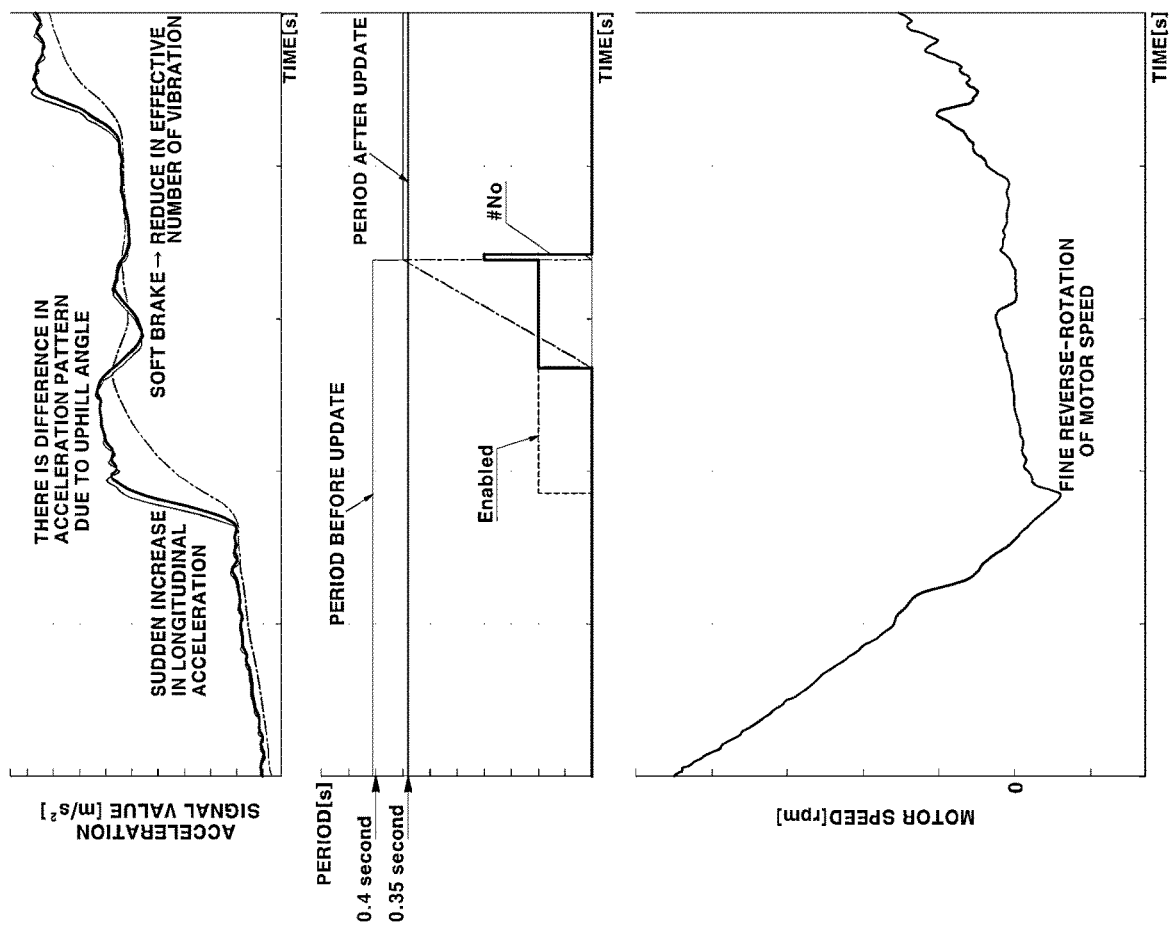
FIG. 5 is a diagram for explaining a method of determining an enable condition of weight estimation according to an embodiment of the present disclosure.

FIG. 4 is a flowchart illustrating procedures of estimating a weight according to an embodiment of the present disclosure. FIG. 5 is a diagram for explaining a method of determining an enable condition of weight estimation according to an embodiment of the present disclosure.

Figure 6:
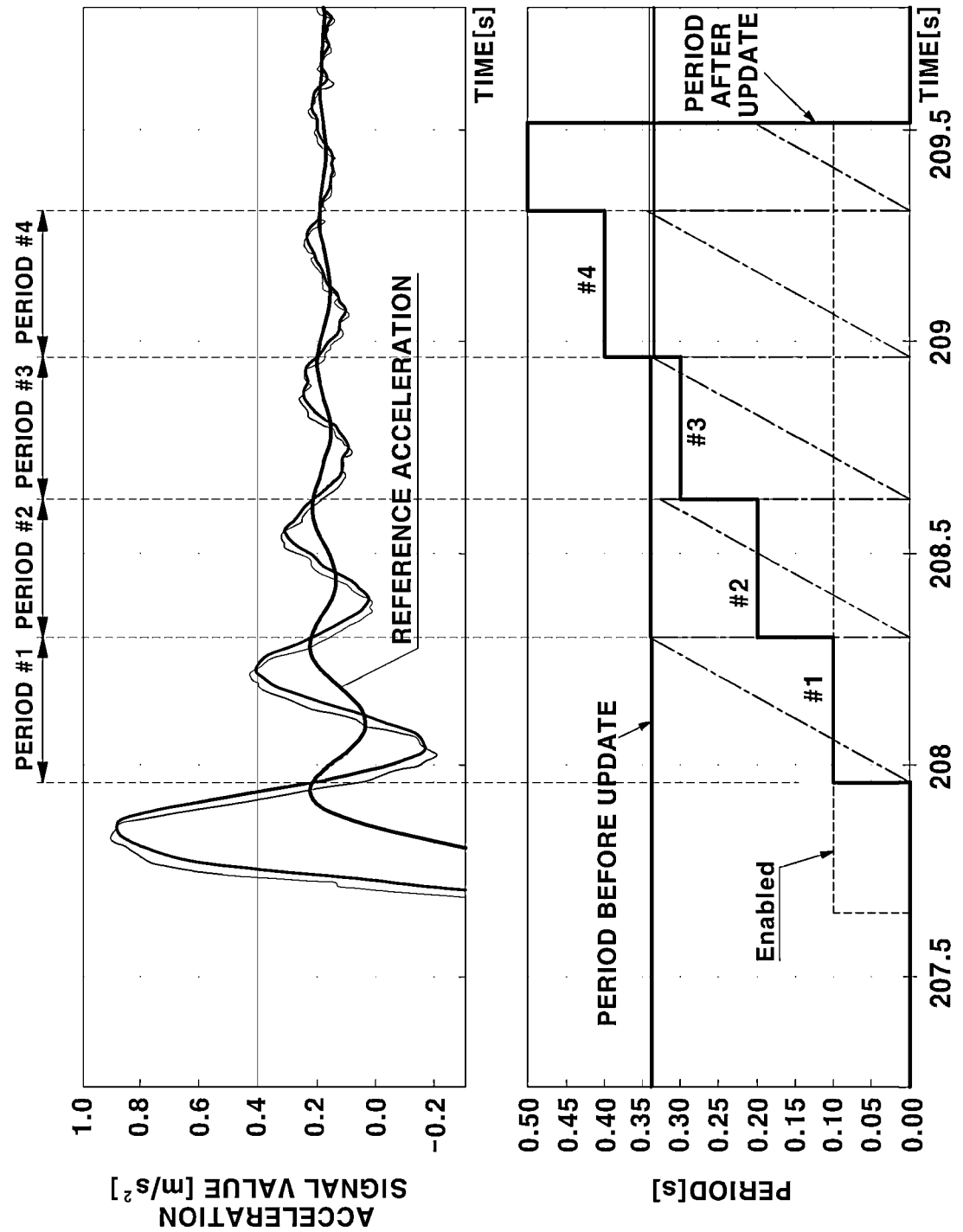
FIG. 6 is a diagram for explaining a method of determining a period of vibration in turn from an acceleration signal according to an embodiment of the present disclosure.

FIG. 6 is a diagram for explaining a method of determining a period of vibration in turn from an acceleration signal according to an embodiment of the present disclosure.

The method of estimating the weight and procedures thereof according to an embodiment of the present disclosure will be described below with reference to FIGS. 4 to 6.

First, in the procedures of estimating the weight, the stoppage event discriminator 21 may determine whether a stoppage event of the vehicle occurs (S11).

The stoppage event discriminator 21 may determine whether to satisfy a predetermined enable condition from vehicle driving information, and when the enable condition is satisfied, the stoppage event discriminator 21 may determine that the stoppage event of the vehicle occurs, and the vehicle may then be in the enable state, in which weight measurement is performed.

Here, when the stoppage event of the vehicle occurs, this means that a current moment is a moment at which the vehicle is stopped via brake, and when the vehicle becomes in the enable state, this means that a current moment is a moment at which the vehicle is stopped and becomes in a state in which weight measurement is performed.

With regard to the enable condition, according to the present disclosure, the weight of the vehicle may be estimated using the acceleration signal measured in a situation in which the vehicle slightly shakes forward and backward when a driver depresses a brake pedal to stop a vehicle wheel while the vehicle travels.

To this end, the enable condition for weight estimation may include a condition in which the driver depresses a brake pedal by a preset reference degree or greater, that is, in which a brake pedal input value detected by the BPS 13 is equal to or greater than a preset pedal input reference value.

The enable condition may include the state in which the vehicle wheel speed detected by the wheel speed sensor 12 is equal to or greater than a wheel speed reference value, and according to the present disclosure, the state in which a brake pedal input value is equal to or greater than a pedal input reference value and a vehicle wheel speed is equal to or less than a wheel speed reference value may refer to the state in which the vehicle is decelerated and is stopped.

As such, when the acceleration signal is periodically changed because the vehicle shakes at a moment when the vehicle is stopped, the weight of the vehicle may be estimated using the acceleration signal.

The enable condition may further include a sudden increase condition in which an inclination of increasing acceleration (longitudinal acceleration) from the signal of the acceleration sensor 11 is equal to or greater than a reference value as shown in FIG. 5, and a condition in which a motor speed detected by the motor speed detector 15 at a gear stage D detected by the gear stage detector 14 is a negative (−) speed.

In an electric motored vehicle driven by a motor, a fine reverse-rotation state of a motor necessarily and temporally occurs at a moment at which the vehicle is stopped, and in this regard, a motor speed may be a negative (−) speed in the fine reverse-rotation state of the motor.

Thus, as shown in FIG. 5, when the motor speed is a negative (−) speed, the fine reverse-rotation state of the motor may be determined to occur, and in this case, a current moment may be determined to be a moment when the vehicle is stopped.

As such, according to the present disclosure, a weight estimation enable condition may further include a condition in which the fine reverse-rotation state of the motor occurs, that is, a condition in which the motor speed may be a negative (−) speed in order to accurately determine that a current moment is a moment at which the vehicle is stopped.

The condition of an inclination of increasing acceleration may be for identifying and excluding an acceleration pattern due to driving on an uphill road, but not a moment in which a vehicle is stopped, and when the longitudinal acceleration (acceleration signal) of the vehicle suddenly increases to a reference value or greater, such an increase in longitudinal acceleration is caused at a moment at which the vehicle is stopped, but not because the vehicle simply travels on an uphill road (refer to FIG. 5).

In addition, according to the present disclosure, a predetermined reference time (which is a maximum enable duration time, for example, 2 seconds) in a state in which the enable condition is satisfied needs to be maintained, and when one of the enable conditions is not satisfied within the reference time and the enable state of weight estimation is disabled, the all procedures of estimating a weight, including determining and updating of a period while the vehicle is stopped, or the like, may be stopped, and values determined while the vehicle is stopped may also be invalidated and disregarded without being updated.

After the enable state of weight estimation is disabled once, it may be enable a next enable state only when a wheel speed reaches a driving reference speed or greater thereafter.

For example, after a vehicle enters an enable state by depressing a brake pedal, the driver takes their foot off the brake pedal within a reference time and then re-depresses the brake pedal, even if the enable condition is re-satisfied, the vehicle may not enter the enable state, and a next weight estimation procedure is disabled.

When the stoppage event discriminator 21 determines that the enable condition is satisfied and a stoppage event of the vehicle occurs, the reference acceleration generator 22 may receive an output signal of the acceleration sensor 11, i.e., the acceleration signal and may generate the reference acceleration signal from the acceleration signal in the weight estimation enable state (S12 and S13), and may input the generated reference acceleration signal to the vibration period determiner.

In the enable state, the vibration period determiner 23 may receive the reference acceleration signal of the acceleration signal from the reference acceleration generator 22, may filter the acceleration signal to remove noise, and may then determine an effective turn from the acceleration signal from which noise is removed (S13), and may then compare an acceleration signal and a reference acceleration signal at the same time zone to determine a period of vibration.

The acceleration signal input to the vibration period determiner 23 may indicate a vehicle longitudinal acceleration at a moment that the vehicle is stopped, and may be an acceleration signal output from the acceleration sensor 11 in a state in which a stoppage event of the vehicle occurs.

The vibration period determiner 23 may remove noise from the acceleration signal using a low pass filter and may then compare the acceleration signal from which noise is removed with the reference acceleration signal to measure a period of vibration of the acceleration signal, and in this case, when the enable condition is satisfied, the period may be measured.

In this case, period measurement may be begun from a time point of satisfying a condition in which the reference acceleration signal value (i.e., a reference acceleration value) is greater than the acceleration signal value (i.e., an acceleration value), but not immediately after the enable state.

That is, time count for period measurement may be begun from an initial time point of satisfying a condition in which the reference acceleration signal value is greater than the acceleration signal value after the enable state.

Then, in the period measurement period, a period with which two signals cross each other may be measured, and as shown in FIG. 6, a time point at which period #1 is started may be a time point (which is a time point at which the two signals values are the same) in which the reference acceleration signal and the acceleration signal first cross each other after the enable state.

That is, the time point at which the period #1 is started may be a time point at which the two signals cross each other immediate before a value obtained by subtracting the acceleration signal value from the reference acceleration signal primally becomes a positive value after the enable state, and a time point at which the period #1 is ended and period #2 is started may be a time point at which the two signals cross each other immediately before a value obtained by subtracting the acceleration signal value from the reference acceleration signal value becomes a positive value thereafter.

In addition, a time point at which the period #2 is ended and period #3 is started may be a time point at which the two signals cross each other immediately before a value obtained by subtracting the acceleration signal value from the reference acceleration signal value becomes a positive value thereafter, and a time point at which the period #3 is ended and period #4 is started may be a time point at which the two signals cross each other immediately before a value obtained by subtracting the acceleration signal value from the reference acceleration signal value becomes a positive value thereafter.

In FIG. 6, a time point at which period #4 is ended may be a time point at which the two signals cross each other immediately before a value obtained by subtracting the acceleration signal value from the reference acceleration signal value becomes a positive value thereafter.

In the above case, the time point at which the two signals cross each other may refer to a time pint at which the reference acceleration signal value and the acceleration signal value are equalized (refer to FIG. 6).

As such, a time point at which a period of each turn is started may be determined as a time point at which the two signals cross each other immediately before a value obtained by subtracting the acceleration signal value from the reference acceleration signal value becomes a positive value, and a time point at which the period of each turn is ended may be determined as a time point at which the two signals cross each other immediately before a value obtained by subtracting the acceleration signal value from the reference acceleration signal value becomes a positive value again after the time point at which the period of each turn is started.

Although FIG. 6 and a description thereof illustrate an example in which period #1 up to period #4 are used as periods of effective turns for weight estimation, this is merely exemplary, and the present disclosure is not limited thereto, or alternatively, the number (n) of effective turns for weight estimation may be changed.

In detail, the vibration period determiner 23 may determine the number (n) of the effective turns from a difference between a first upper peak value and a first lower peak (first valley) of the acceleration signal.

In this case, the vibration period determiner 23 may use data such as a table obtained by presetting the number of effective turns, which corresponds to the difference between the first upper peak value and the first lower peak (first valley value) of the acceleration signal.

That is, the first upper peak value and the first lower peak value (first valley value) may be obtained from the acceleration signal, the number (e.g., n=4) of effective turns, which corresponds to the difference between the upper peak value and the lower peak (valley) value, may be determined, and the weight of the vehicle may be estimated using a value of a period of each turn up to the determined number of effective turns (e.g., #1 to #4).

FIG. 6 illustrates an example in which the number (n) of effective turns is 4 after the enable state, and periods to #4 from #1 are determined, and when the number (n) of effective turns is greater than 4, a time point at which a period of a previous turn is ended and a period of a next turn is started may be sequentially determined for respective turns as a time point at which the two signals cross each other immediately before a value obtained by subtracting the acceleration signal value from the reference acceleration signal value becomes a positive value.

According to the present disclosure, a period measured for each turn up to the effective turns may be defined as a time between start and end time points of a period of the corresponding turn, a counted period may be determined as an effective period value only when the counted period is a value within a setting normal range despite the effective turn, and when the counted period value for each turn deviates from the normal range, the period value may be invalidated and disregarded as a value of 0.

When the vibration period determiner 23 determines a period of each turn in the effective turns, the determined period value of each turn may be input to the period information updater 24, and thus, the period information updater 24 may update and store a period value for each turn (i) using a new period value (S14 and S15).

According to the present disclosure, when the enable condition is satisfied whenever the vehicle stoppage event occurs, a period value for each turn (i) may be obtained until the number (n) of the effective turns are reached, and the period value for each turn may be updated using a new period value.

That is, a period may be updated for each of a period value (time) of period #1, a period value of period #2, a period value of period #3, and a period value of period #4 whenever the vehicle stoppage event occurs.

When a period value of a specific turn deviates from a normal range while the vehicle is stopped, if the vibration period determiner 23 invalidates and disregards the period value, there is no new period value input to the period information updater 24 from the vibration period determiner 23, and thus the period value of the specific turn may not be updated and a previous period value may be maintained.

Here, the previous period value may refer to an updated or maintained period value of the corresponding turn when the vehicle is stopped before.

When the period value is updated, a period value for each turn may be determined and stored as a new period value that is determined when the vehicle is stopped at this time.

That is, the period value that is pre-stored for each turn may be deleted, and a new period value that is determined when the vehicle is stopped at this time may be newly recorded and stored.

In addition, a moving average of a period value that is measured for each turn whenever the vehicle stoppage event occurs may be calculated, and the calculated moving average value may be updated and stored as a new period value.

For example, if period #1 is 0.4 seconds, period #2 is 0.39 seconds, and period #3 is 0.41 seconds until the previous vehicle stoppage event occurs, and if period #1 is 0.42 seconds, period #2 is 0.43 seconds, and period #3 is outside a normal range and is invalidated (there is no period #3) when this vehicle stoppage event occurs, period #1 may be updated to 0.42 seconds as a new period determined when this vehicle stoppage event occurs and period #2 may be updated to a new period of 0.43 seconds when a period is updated, and period #3 may be maintained as a previous period of 0.41 seconds.

In addition, 0.42 seconds as a value of period #1 which is newly determined when this vehicle stoppage event occurs and values of period #1 obtained whenever the previous vehicle stoppage event occurs may be summed, and the summed values of period #1 may be averaged to obtain an average value, and similarly, also in periods #2 and #3, a new period value at a moment when the vehicle is stopped at this time and period values of the corresponding turn at the vehicle is stopped before may be summed, and the summed values may be averaged to obtain an average value, and the period value for each turn may be updated using the average values.

Then, the period information updater 24 may update the measured vibration period for each turn and may also sum information on an updated period for each turn to determine the final period information using a predetermined method (S16).

In the period summing procedure, final periods for respective turns may be summed as one period result value, and for example, when period #1 is 'A', the sum of period #1 and period #2 is 'B', the total sum of period #1 and period #2, and period #3 is 'C', the sum of A, B, and C may be determined the final period value.

In this case, the period information updater 24 may predetermine the number of reference periods and may calculate a required period value using period information corresponding to the predetermined number of the reference periods, and in this regard, when the number of the reference periods is 3, the period information updater 24 may calculate a final summing period by deriving values of 3 multiple of A, 1.5 multiple of B, and 1 multiple of C, applying a predetermined weight to each of the derived values, and summing the values.

Here, the number of the reference periods may be a value that is determined to use a time of several periods as a determination factor for estimating a final weight.

In the above example, the reference means that a time of three periods is used as a factor, and in more detail, a value of A may correspond to first one period.

Thus, when the number of reference periods is 3, a value of 3 multiple of A needs to be used in order to calculate a value corresponding to three periods, and when effective data is present up to a second period (B), a value obtained by deriving 1.5 multiple of B may be used to calculate two periods as three periods as a reference period.

When effective data is present up to a third period (C), the number of periods is 3, and thus three periods may be the same as three periods as the reference period, and accordingly, 1 multiple of C may be used.

When effective data is present up to a fourth period (D), a value obtained by deriving 0.75 multiple of D may be used to calculate four periods as three periods as the reference period, and similarly, a value for calculating five periods may be ⅗ multiple, and a value for calculating six periods may be 0.5 multiple.

As such, calculation of effective turns up to n periods may be understood.

In addition, when the number of the reference periods is 2, 2 multiple of A, 1 multiple of B, ⅔ multiple of C, ½ multiple of D, or the like may be used.

Then, the final summing period calculated by the period information updater 24 may be input to the weight determiner 25 and a weight of the vehicle is calculated by the weight determiner 25 (S16), and the weight determiner 25 may determine the weight of the vehicle using setting data from the summing period that is a final vibration period value (period measurement value) of the acceleration signal.

To this end, setting data for determining and outputting the weight of the vehicle using a summing period which is a final vibration period value may be pre-input, stored, and used in the weight determiner 25.

The setting data may be obtained using the preceding test and evaluation result with respect to the same type vehicle, and may be data obtained by predefining a relationship between the weight of the vehicle and a vibration period (summing period) value of the corresponding vehicle.

In more detail, the setting data may be a map or table in which a value corresponding to a period of vibration is set to the weight of the vehicle, or may be a mathematical expression obtained by defining the weight of the vehicle using a function of a vibration period value of the acceleration signal.

Here, an example of the mathematical expression is now described. First, a relationship between a vehicle weight (m) and a frequency ($\omega_n$) of the acceleration signal may be represented using Equation (1) below.

$$\omega_n = \sqrt{k/m} \qquad \text{Equation (1):}$$

Here, the frequency ($\omega_n$) using a period value (T) may be represented using Equation (2) below.

$$2\pi/T \approx \omega_n = \sqrt{k/m} \qquad \text{Equation (2):}$$

In short, Equation (3) may be derived, and lastly, the vehicle weight (m) using the period value (T) and a spring rigidity (k) which is predetermined as a fixed constant may be represented using Equation (4) below.

$$4\pi^2/T^2 = k/m \qquad \text{Equation 3}$$

$$m = \left(\frac{k}{4\pi^2}\right)T^2 \qquad \text{Equation 4}$$

In Equation (4) above, the period value T may be a final period value of the acceleration signal, which is lastly determined by the period information updater 24, which may be defined using 'T=final summing period/number of reference periods'.

As such, according to the present disclosure, the weight of the vehicle may be estimated using vehicle longitudinal acceleration information that is a vehicle behavior phenomenon at a moment when the vehicle is stopped, and in more detail, the weight of the vehicle may be stably estimated without influence of a gradient using the acceleration signal (i.e., a signal indicating a vehicle longitudinal acceleration value) output from the acceleration sensor 11 at a moment when the vehicle is stopped.

According to the present disclosure, it may be possible to estimate the current weight of a vehicle simply using existing hardware without use of an additional sensor in the vehicle.

According to the present disclosure, the weight of the vehicle may be estimated and updated whenever a vehicle stoppage event occurs, for example, when the vehicle is stopped at a traffic light while traveling, and the estimated weight information may be used to control the vehicle.

The aforementioned weight estimating method according to the present disclosure may be applied to an electric vehicle (EV) driven using a motor and may be usefully used to estimate the weight of the vehicle.

Accordingly, when the weight estimating method of the vehicle is used, a current weight of the vehicle may be estimated simply using existing hardware without use of an additional sensor in the vehicle.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. A method of estimating a weight of a vehicle, the method comprising:
    determining, by a weight estimating system, whether a current state is an enable state in which a vehicle stoppage event due to brake occurs from vehicle driving information;
    when the current state is the enable state, removing noise by the weight estimating system, by filtering an acceleration signal input from an acceleration sensor at a moment when the vehicle is stopped;
    determining, by the weight estimating system, a time period value of the acceleration signal from which noise is removed;
    estimating, by the weight estimating system, the weight of the vehicle using information on the time period value as determined; and
    controlling, by a controller, the vehicle using the weight information as estimated.

2. The method of claim 1, wherein the vehicle driving information includes a brake pedal input value and a vehicle wheel speed; and wherein the determining whether the current state is the enable state includes determining that the current state is the enable state when both of a first condition, in which the brake pedal input value is equal to or greater than a predetermined pedal input reference value, and a second condition, in which the wheel speed is equal to or less than a predetermined wheel speed reference value, are satisfied.

3. The method of claim 2, wherein the vehicle driving information further includes an acceleration detected by the acceleration sensor, and a current gear stage and motor speed; and wherein, when a sudden increase condition, in which an inclination of increasing the acceleration is equal to or greater than a reference value, and a third condition, in which motor reverse rotation whereby a motor speed is a negative speed in the gear stage D occurs, are further satisfied, the current state is determined to be enable state.

4. The method of claim 2, wherein, when brake pedal input is released in the enable state, the enable state for weight measurement is released, and then only when the wheel speed has reached a predetermined driving reference speed or greater, the current state is determined to be the enable state if the brake pedal input value condition and the wheel speed condition are re-satisfied.

5. The method of claim 1, wherein the determining the time period value of the acceleration signal includes:

generating a reference acceleration signal after filtering the acceleration signal input from the acceleration sensor at the moment when the vehicle is stopped; and comparing the reference acceleration signal with the acceleration signal in a same time zone in which the noise is removed and determining a start time point when a time period of each turn in the acceleration signal is started and an end time point when the time period of each turn is ended;

counting a time between the start time point when the time period of each turn is started and the end time point when the time period of each turn is ended and determining the counted time as a time period value of a corresponding turn;

updating the time period value for each turn, which is stored when a previous vehicle stoppage event occurs, using the determined period value for each turn; and determining a final time period value of an acceleration signal for estimating the weight of the vehicle using an updated time period value for each turn.

6. The method of claim 5, wherein the number of effective turns is determined using information on upper and lower peak values of the acceleration signal from which the noise is removed, and the time period value for each turn is determined for the determined number of effective turns, wherein the number of effective turns is determined, by a vibration time period determiner, using data including a table obtained by presetting the number of effective turns, which corresponds to the difference between a first upper peak value and a first lower peak of the acceleration signal.

7. The method of claim 6, wherein the number of effective turns, which corresponds to a difference between the first upper peak value and the first lower peak value in the acceleration signal with the noise removed therefrom, is determined.

8. The method of claim 5, wherein the generating the reference acceleration signal by filtering the acceleration signal includes filtering the acceleration signal via the low pass filter to generate the reference acceleration signal; and wherein a first low pass filter for generating the reference acceleration signal is a filter having a lower cutoff frequency than a second low pass filter for removing noise by filtering the acceleration signal.

9. The method of claim 5, wherein the start time point when the time period of each turn is started and the end time point when the time period of each turn is ended in the acceleration signal are determined as a cross time point when two signals cross each other, which is a time point indicating a value in which the acceleration signal and the reference acceleration are the same.

10. The method of claim 5, wherein a time point of starting time period #1 as a first time period after the enable state of the start time point when the time period for each turn is started is determined as a cross time point when the two signals cross each other immediately before a value obtained by subtracting an acceleration signal value from the reference acceleration signal value primally becomes a positive value after the enable state; and wherein an end time point of ending the time period #1 and a start time point of starting period #2 as a second time period are determined as a cross time point when two signals cross each other immediately before a value obtained by subtracting the acceleration signal value from the reference acceleration signal value becomes the positive value thereafter;

wherein, thereafter and repeatedly, the start time point of starting the time period for each turn is determined as a cross time point when the two signals cross each other immediately before a value obtained by subtracting the acceleration signal value from a reference acceleration signal value becomes a positive value; and wherein the time point of ending the time period for each turn is determined as a cross time point when the two signals cross each other immediately before a value obtained by subtracting the acceleration signal value from the reference acceleration signal value becomes a positive value again after the time period is started.

11. The method of claim 5, wherein the updating the time period value for each turn includes deleting a pre-stored time period value of the corresponding turn and storing and updating a newly determined time period value for the corresponding turn, or wherein a value obtained by summing pre-stored time period values of corresponding turns and the newly determined time period value of the corresponding turn and averaging the summed values is stored and updated as the time period value of the corresponding turn.

12. The method of claim 5, wherein the determining the counted time as the time period value of the corresponding turn includes determining an effective time period value for each turn only when the determined time period value for each turn is a value within a set normal range; and wherein, when the determined time period value for each turn deviates from the normal range, a time period value of a corresponding turn is invalidated as a value of 0.

* * * * *